United States Patent [19]
Crinkelmeyer et al.

[11] 3,922,172
[45] Nov. 25, 1975

[54] HIGH-ALUMINA CEMENT

[75] Inventors: Oliver W. Crinkelmeyer, Tulsa; Earl F. Morris, Wagoner, both of Okla.

[73] Assignee: The Dow Chemical Company, Midland, Mich.

[22] Filed: Jan. 7, 1974

[21] Appl. No.: 431,270

[52] U.S. Cl. ............... 106/104; 106/109; 106/314; 106/315
[51] Int. Cl.² ............................................ C04B 7/32
[58] Field of Search ............ 106/104, 109, 314, 315

[56] References Cited
UNITED STATES PATENTS
3,600,203   8/1971   Aldera ............................... 106/104

Primary Examiner—J. Poer
Attorney, Agent, or Firm—Bruce M. Kanuch

[57] ABSTRACT

A high-alumina cement composition is disclosed which has thermal stability over a wide temperature range and which develops strength at an early age. The cement composition comprises a high-alumina cement, a halide salt and calcium sulfate. This composition when added to water provides a hydraulic cement composition which can be employed in environments subject to wide temperature fluctuations below and above freezing (e.g. 32°F).

4 Claims, No Drawings

HIGH-ALUMINA CEMENT

BACKGROUND OF THE INVENTION

High-alumina cements are known for their high temperature stability. However, they are also known to lose their strength when subjected to thermal variations. For example, it has been shown that a set high-alumina cement having a 10,000 psi compressive strength lost as much as 90 percent or more of its strength when subjected to variations in temperature. It is known that the loss of compressive strengths of aluminous cements subjected to temperature variations can be prevented by incorporating calcium sulfate into the cement. However, calcium sulfate lowers the heat of hydration of the system and thus limits the use of the cement at lower temperatures. Under colder conditions the system may freeze before setting or fail to develop strength rapidly enough to be commercially acceptable as a cold weather cement. The present invention concerns the unexpected discovery that a halide salt, which is known to be a freezing point depressant and also is known to retard the setting of high-alumina cements, at all concentrations, when admixed with a high-alumina cement containing calcium sulfate actually functions to both prevent the hydraulic cement slurry from freezing and also, and surprisingly, greatly increases the early strengths, i.e. functions as an accelerator instead of a retarder in the specific cement system claimed herein.

SUMMARY OF THE INVENTION

The present invention concerns a cement and a method of cementing in environments containing temperatures varying from those below freezing (i.e. 32°F) to above 100°F and the like.

The composition of the present invention contains a high-alumina cement, an effective amount of calcium sulfate to prevent strength degradation of the set cement at elevated temperatures, an effective amount of a halide salt to accelerate the rate of setting and prevent the freezing of said composition at temperatures below about 32°F, and sufficient water to form a hydraulic cement slurry which sets to a solid having adequate strength within a period of time which is practical.

In practicing the method of the present invention a cement slurry of the present invention is employed to cement, for example, bore holes and the like in environments wherein temperature fluctuations vary from below freezing (i.e. 32°F) to above about 100°F. The method employs standard cementing equipment and procedures well known in the art.

DETAILED DESCRIPTION OF THE INVENTION

High-alumina cement, known also as aluminous cement is not Portland cement. It is made by fusing a mixture of limestone and bauxite with small amounts of silica and titania. In Europe, the process is usually carried out in an open-hearth furnace having a long vertical stack into which the mixture of raw materials is charged. The hot gases produced by a blast of pulverized coal and air pass through the charge and carry off water and carbon dioxide. Fusion occurs when the charge drops from the vertical stack onto the hearth at a temperature of about 1,425° to 1,500°C. A molten liquid is formed and is continuously collected and solidified in steel pans which are carried on an endless belt. Electric arc furnaces also have been used when electric power is cheap. In the United States, the mixture is burned in a rotary kiln similar to that used for Portland cement but provided with a tap hole from which the molten liquid is drawn intermittently. A black solidified sinter is formed and is stored, e.g. in storage piles, from which it is transferred to crushing and grinding mills where it is reduced, without additions, to a fine powder.

Aluminous cement is composed of, as percent by weight, from about 36 to 42 percent $Al_2O_3$, about the same amount of CaO, about 7 to 18 percent oxides of iron, about 5 to 10 percent $SiO_2$, and small amounts of $TiO_2$, MgO and alkalies. A number of other compounds include minor amounts of, for example, $CaO \cdot Al_2O_3$; $6CaO \cdot 4Al_2O_3$; $FeO \cdot SiO_2$; $2CaO \cdot Al_2O_3 \cdot SiO$ and ferrites. The setting and hardening of the cement when mixed with water is probably brought about by the formation of calcium aluminate gels, such as, $CaO \cdot Al_2O_3 \cdot 10H_2O$; $2CaO \cdot Al_2O_3 \cdot 8H_2O$ and $3CaO \cdot Al_2O_3 \cdot 6H_2O$.

One of the notable properties of high-alumina cement is its development of very high strengths at early ages. It attains nearly its maximum strength in less than a day, which is much higher than the strength developed by Portland cement at that age. At higher temperatures, however, the strength drops off rapidly. Heat is also evolved rapidly on hydration and results in high setting temperatures. The resistance of the cement to corrosion in sea or sulfate waters, as well as its resistance to weak solutions of mineral acids, is outstanding. An analysis of a typical high-alumina cement is:

| Constituents | Per Cent by Weight |
| --- | --- |
| SiO | 8 to 9 |
| $Al_2O_3$ | 40 to 41 |
| CaO | 36 to 37 |
| $Fe_2O_3$ | 5 to 6 |
| FeO | 5 to 7 |
| $TiO_2$ | about 2.0 |
| MgO | about 1.0 |
| S | about 0.2 |
| $SO_2$ | about 0.2 |
| Metallic Iron | trace |

The cement composition of the present invention comprises a high-alumina cement and, based on the weight of high-alumina cement, from about 5 to about 30 percent by weight of calcium sulfate, and based on the weight of high-alumina cement and calcium sulfate, from about 35 to about 50 percent by weight of water. A halide salt is present in an amount ranging from about 5 to about 15 percent by weight of water. Preferably the cement slurry contains a high-alumina cement and from about 20 to about 25 percent by weight of calcium sulfate. Water is employed in an amount ranging from about 38 to 44 percent by weight based on the weight of high-alumina cement and calcium sulfate and the halide salt is present in an amount ranging from about 8 to about 12 percent by weight of the water.

Halide salts which can be employed include any which lower the freezing point of water and are not detrimental to the cement composition. Preferred salts are sodium chloride, potassium chloride and lithium chloride. The halide salt may be dry blended with the dry high aluminum cement or may be present in the form of a brine which is used to prepare the hydraulic cement slurry.

Calcium sulfate in an anhydrous or hydrated form can be employed. The amount of calcium sulfate to be employed is based on anhydrous calcium sulfate.

Other ingredients well known in the art can be included in the composition of the invention to perform such functions as prevent fluid loss from the hydraulic cement slurry, to increase the density of the hydraulic cement slurry and the like. For example silica flour, sand, barite, various polymeric fluid loss additives and the like can be incorporated into the composition of the present invention.

The hydraulic cement slurry of the invention can be employed to cement casing into petroleum producing boreholes in environments wherein the surface conditions are below freezing and the temperature at the lower end of the well bore may be as much as 100°F or higher. Well known cementing techniques and equipment can be employed to emplace the cement slurry.

EXAMPLE 1

In this first example, nine high-alumina cement slurries were prepared containing the constituents set forth in the following Table I. Each of these slurries was then cast into 2 inch cubes and kept at a temperature of 40°F for 3 days at the end of which their compressive strengths were determined. The samples were then left for one day at 100°F and their compressive strength again determined. The samples were then maintained at a temperature of 160°F for three days. The compressive strength was determined at the end of one day, and then again at the end of the third day. The compressive strengths were determined by breaking the cubes on a Tinis Olsen Compressive Strength tester according to the procedure set forth in API RP10B, 17th Ed., 1971. The results of these tests are also set forth in the following Table I.

TABLE I

| Test No. | *Constituents in Hydraulic Cement Slurry | | | Compressive Strength psi at End of Time Period at Temperature | | | |
|---|---|---|---|---|---|---|---|
| | CaSO₄ Anhydrous | NaCl | H₂O | 40°F 3 days | 100°F 1 day | 160°F 1 day | 160°F 3 days |
| 1 | 20 | | 40 | 3925 | 6450 | 4790 | 6440 |
| 2 | — | — | 38 | 7440 | 9450 | 3050 | 2890 |
| 3 | 10 | | 40 | 6780 | 8600 | 2120 | 2385 |
| 4 | 25 | | 40 | 3025 | 4665 | 4515 | 6225 |
| 5 | 22.5 | | 40 | 2800 | 4950 | 5400 | 5815 |
| 6 | 20 | | 40 | 3335 | 4040 | 4050 | 5290 |
| 7 | 20 | 3 | 40 | 6210 | 6925 | 6900 | 5700 |
| 8 | 20 | 10 | 40 | 6675 | 6750 | 6425 | 6360 |
| 9 | 20 | 3 | 40 | 5850 | 7875 | 8260 | 9000 |
| 10 | 22.5 | 10 | 40 | 5625 | 6090 | 7350 | 7015 |
| 11 | — | 12 | 46 | 2200 | 4600 | 680 | 730 |

*In this and the following tables CaSO₄ is expressed as per cent by weight of the high-alumina cement, water is expressed as per cent by weight of the total of CaSO₄ and high-alumina cement and the halide salt as per cent by weight of water.

EXAMPLE 2

In this example three different cement compositions were prepared containing a high-alumina cement and anhydrous calcium sulfate. Two of the mixtures also contained sodium chloride and the third did not. These three cement compositions were cast into cubes in the manner similar to that described in Example 1 and their compressive strengths were determined at the end of certain periods of time over a period of 15 days. During this time the cubes were subjected to variations in temperature ranging from 20°F to 80°F. The hydraulic slurry composition contained the constituents set forth in the following Table II.

TABLE II

| | Calcium Sulfate | Sodium Chloride | Water |
|---|---|---|---|
| Composition A | 20% | 10% | 40% |
| Composition B | 22.5 | 10 | 40 |
| Composition C | 22.5 | 0 | 40 |

The results of these tests are set forth in the following Table III.

TABLE III

| Day | Temperature °F 24 Hour Periods Immediately Prior to Compressive Strength Determination | Composition & Compressive Strength psi | | |
|---|---|---|---|---|
| | | A | B | C |
| 1 | 40 | | | |
| 2 | 40 | | | |
| 3 | 20 | | | |
| 4 | 80 | 7100 | 6925 | 4300 |
| 5 | 20 | | | |
| 6 | 20 | | | |
| 7 | 20 | | | |
| 8 | 80 | 5400 | 8100 | 4325 |
| 9 | 20 | | | |
| 10 | 80 | 7100 | 7325 | 3825 |
| 11 | 20 | | | |
| 12 | 20 | | | |
| 13 | 20 | | | |
| 14 | 20 | | | |
| 15 | 80 | 5575 | 8300 | 4375 |

EXAMPLE 3

In this example various amounts of sodium chloride were added to a hydraulic cement slurry containing a high-alumina cement, 22.5 percent by weight of calcium sulfate, based on the weight of alumina cement, and 40 percent by weight of water, based on the weight of alumina cement and calcium sulfate. The hydraulic cement slurries were than cast into cubes as in the manner set forth in Example 1 and maintained at a temperature of 40°F for a period of 3 days. The compressive strength of each sample was determined at the end of a certain period of time as set forth in the following Table IV. The amount of salt at various compressive strengths are also set forth in the following Table IV. In Test No. 8 no calcium sulfate was present.

TABLE IV

| Test No. | Wt. % NaCl | Compressive Strength psi | | | |
|---|---|---|---|---|---|
| | | 16 Hr. | 24 Hr. | 48 Hr. | 72 Hr. |
| 1 | 0 | 85 | 990 | 1450 | 1805 |
| 2 | 3 | 300 | 2100 | 4875 | 5650 |
| 3 | 8 | 1945 | 3575 | 4875 | 5815[3] |

TABLE IV-continued

| Test No. | Wt. % NaCl | Compressive Strength psi | | | |
|---|---|---|---|---|---|
| | | 16 Hr. | 24 Hr. | 48 Hr. | 72 Hr. |
| 4 | 10 | 2045 | 3760 | 4750 | 6090 |
| 5 | 12 | 1870 | 3380 | 4190 | 4965 |
| 6 | 14 | 1515 | 2950 | 4690 | 4340 |
| 7 | 16 | 1090 | 2460 | 3750 | 4475 |
| 8[2] | 12 | not set | not set | — | 2200 |
| 9 | 12 LiCl | 1250 | 1430 | — | — |
| 10 | 12 KCl | 265 | 2040 | — | — |

[1] This is average of compressive strengths determined on 3 samples of same composition.
[2] No $CaSO_4$
[3] In Test Nos. 3 and 5–7 the compressive strengths for 48 hr. and 72 hr. periods were determined on the same compositions but prepared at a later time.

What is claimed is:

1. A hydraulic cement composition comprising, as percent by weight:
   a. a high-alumina cement,
   b. calcium sulfate from about 5 to about 30 percent, based on the weight of high-alumina cement,
   c. water, from about 35 to about 50 percent based on the total weight of (a) and (b), and
   d. a halide salt selected from the group consisting of NaCl, KCl, from about 5 to about 15 percent, based on the weight of water.

2. The composition of claim 1 wherein the halide salt is NaCl.

3. The composition of claim 1 wherein the calcium sulfate is present in an amount ranging from about 20 to about 25 percent, the water is present in an amount ranging from about 38 to about 44 percent, and the halide salt is present in an amount ranging from about 8 to about 12 percent.

4. The composition of claim 3 wherein the halide salt is NaCl.

* * * * *